United States Patent
Tiwari

(10) Patent No.: US 8,406,202 B2
(45) Date of Patent: Mar. 26, 2013

(54) APPARATUSES AND METHODS FOR HANDLING TIMERS FOR ROUTING AREA (RA) UPDATE PROCEDURES OR ATTACHMENT PROCEDURES WITHOUT INTEGRITY PROTECTION

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 151 days.

(21) Appl. No.: 13/095,333

(22) Filed: Apr. 27, 2011

(65) Prior Publication Data

US 2011/0268092 A1    Nov. 3, 2011

Related U.S. Application Data

(60) Provisional application No. 61/328,780, filed on Apr. 28, 2010.

(51) Int. Cl.
*H04B 7/216* (2006.01)
*H04M 11/04* (2006.01)

(52) U.S. Cl. ..................... 370/335; 455/404.1

(58) Field of Classification Search .................. None
See application file for complete search history.

(56) References Cited

U.S. PATENT DOCUMENTS

| | | | | |
|---|---|---|---|---|
| 8,041,335 B2* | 10/2011 | Khetawat et al. | .......... | 455/404.2 |
| 2008/0102831 A1 | 5/2008 | Ore | | |
| 2009/0017863 A1 | 1/2009 | Rowley et al. | | |
| 2010/0297979 A1* | 11/2010 | Watfa et al. | .......... | 455/404.1 |
| 2010/0317315 A1* | 12/2010 | Burbidge et al. | .......... | 455/404.1 |
| 2011/0171924 A1* | 7/2011 | Faccin et al. | .......... | 455/404.1 |
| 2011/0171925 A1* | 7/2011 | Faccin et al. | .......... | 455/404.1 |
| 2011/0171926 A1* | 7/2011 | Faccin et al. | .......... | 455/404.1 |
| 2011/0275342 A1* | 11/2011 | Ramle et al. | .......... | 455/404.1 |
| 2012/0208487 A1* | 8/2012 | Tiwari | .......... | 455/404.1 |

FOREIGN PATENT DOCUMENTS

| | | |
|---|---|---|
| CN | 1902976 A | 1/2007 |
| JP | 2007-511142 A | 4/2007 |
| KR | 10-2004-0058422 A | 7/2004 |
| WO | WO 2005/048630 A1 | 5/2005 |

OTHER PUBLICATIONS

3GPP, 3rd Generation Partnership Project; Technical Specification Group Core Network and Terminals; Mobile Radio Interface Layer 3 Specification; Core Network Protocols; Stage 3 (Release 9), 3GPP TS 24.008, vol. 9.2.0, Mar. 1, 2010, 605 pages, XP002652879.

3GPP, "Clarification to the T3312 and T3302 Timer Value When a UE is Emergency Attached Without Security Procedure.," C1-101642, 3GPP TSG CT WG1 Meeting #64, Kyoto, Japan, May 10-14, 2010, 10 pages, XP002652880.

HTC, "Clarification to the T3312 and T3302 Timer Value When a UE is Emergency Attached Without Security Procedure.," C1-102125, 3GPP TSG CT WG1 Meeting #65, Dublin, Ireland, Jun. 28-Jul. 2, 2010, 2 pages, XP050442907.

(Continued)

*Primary Examiner* — Clemence Han
(74) *Attorney, Agent, or Firm* — Birch, Stewart, Kolasch & Birch, LLP

(57) ABSTRACT

A mobile communication device with a wireless module and a controller module is provided. The wireless module performs wireless transceiving to and from a service network. The controller module transmits an attachment request message without integrity protection to the service network via the wireless module, and receives an attachment response message without integrity protection from the service network via the wireless module. Also, the controller module directly applies a first value of a periodic Routing Area (RA) update timer included in the attachment response message.

12 Claims, 9 Drawing Sheets

OTHER PUBLICATIONS

Samsung, "Analysis of All Non-integrity Protected NAS Messages," C1-060758, 3GPP TSG-CT1 Meeting #42, Sophia Antipolis, France, May 8-12, 2006, 3 pages, XP050022758.

Samsung, "Mitigating the Risk of DoS Attacks that Utilizes Non-integrity Protected NAS Messages," Tdoc C1-061905, 3GPP TSG-CT1 Meeting #43, Da Lian, China, Aug. 28-Sep. 1, 2006, 11 pages, XP002652881.

ETSI TS 123 122 V9.2.0 (Apr. 2010); Digital cellular telecommunications system (Phase 2+); Universal Mobile Telecommunications System (UMTS); Non-Access-Stratum (NAS) functions related to Mobile Station (MS) in idle mode (3GPP TS 23.122 version 9.2.9 Release 9); pp. 1-43.

ETSI TS 124 008 V9.2.0 (Apr. 2010); Digital cellular telecommunications system (Phase 2+); Universal Mobile Telecommunications System (UMTS); LTE; Mobile radio interface Layer 3 specification; Core network protocols; Stage 3 (3GPP TS 24.008 version 9.2.0 Release 9); pp. 1-604.

ETSI TS 133 102 V9.2.0 (Apr. 2010); Universal Mobile Telecommunications System (UMTS); LTE; 3G security; Security architecture (3GPP TS 33.102 version 9.2.0 Release 9); pp. 1-72.

3GPP TSG CT WG1 Meeting #65, Dublin (Ireland), Jun. 28-Jul. 2, 2010; C1-102125; HTC; "Clarification to the T3312 and T3302 timer value when a UE is emergency attached without security procedure."; 2 pages.

3GPP TSG-CT WG1 Meeting #64, Kyoto (Japan), May 10-14, 2010; C1-101642; HTC; "Clarification to the T3312 and T3302 timer value when a UE is emergency attached without security procedure."; 10 pages.

\* cited by examiner

US 8,406,202 B2

APPARATUSES AND METHODS FOR HANDLING TIMERS FOR ROUTING AREA (RA) UPDATE PROCEDURES OR ATTACHMENT PROCEDURES WITHOUT INTEGRITY PROTECTION

CROSS REFERENCE TO RELATED APPLICATIONS

This Application claims priority of U.S. Provisional Application No. 61/328,780, filed on Apr. 28, 2010, and the entirety of which is incorporated by reference herein.

BACKGROUND OF THE INVENTION

1. Field of the Invention

The invention generally relates to handling timers of periodic Routing Area (RA) updates, and more particularly, to apparatuses and methods for handling timers for RA update procedures or attachment procedures without integrity protection.

2. Description of the Related Art

In a typical mobile communications environment, a user equipment (UE), including a mobile telephone (also known as cellular or cell phone), a laptop computer with wireless communications capability, or a personal digital assistant (PDA) etc., may communicate voice and/or data signals with one or more service network. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

Take the WCDMA technology in compliance with the 3GPP TS 24.008 specification, v.9.2.0 (referred to herein as the TS 24.008 specification), the 3GPP TS 33.102 specification, v.9.2.0 (referred to herein as the TS 33.102 specification), and the 3GPP TS 23.122 specification, v.9.2.0 (referred to herein as the TS 23.122 specification) for example. For normal services, the wireless communications between the UE and the service network may be preferably performed when integrity protection and/or ciphering protection is on. On the other hand, in cases of emergency services or some other situations, the integrity protection and/or the ciphering protection is not mandatory for the wireless communications between the UE and the service network. In other words, the Packet-Switched (PS) messages may be transmitted without integrity protection and/or the ciphering protection. In this case, if a PS message indicating a value for a periodic RA update timer is received from the service network and the PS message is transmitted without integrity protection, then the UE may not apply the indicated value of the periodic RA update timer and the indicated value of the retry timer for the RA update or attachment procedures, and problems, such as indeterminate behavior of the UE, inconsistency of the periodic RA update timer between the UE and the service network, inappropriate prolonging of the periodic RA update procedure, and even malicious manipulation by a fake service network, etc., may occur.

BRIEF SUMMARY OF THE INVENTION

In one aspect of the invention, a mobile communication device comprising a wireless module and a controller module is provided. The wireless module performs wireless transceiving to and from a service network. The controller module transmits an attachment request message without integrity protection to the service network via the wireless module, and receives an attachment response message without integrity protection from the service network via the wireless module. Also, the controller module directly applies a first value of a periodic Routing Area (RA) update timer included in the attachment response message.

In another aspect of the invention, a mobile communication device comprising a wireless module and a controller module is provided. The wireless module performs wireless transceiving to and from a service network. The controller module transmits an attachment request message without integrity protection or an RA update request message without integrity protection to the service network via the wireless module, and receives an attachment response message without integrity protection or an RA update response message without integrity protection from the service network via the wireless module. Also, the controller module directly applies a value of a retry timer for RA update procedures or attachment procedures included in the attachment response message or the RA update response message, or directly applying a predetermined non-zero value for the retry timer, wherein the predetermined non-zero value is smaller than a default value of the retry timer.

Other aspects and features of the present invention will become apparent to those with ordinarily skill in the art upon review of the following descriptions of specific embodiments of apparatuses and methods for handling timers for RA update procedures or attachment procedures without integrity protection.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
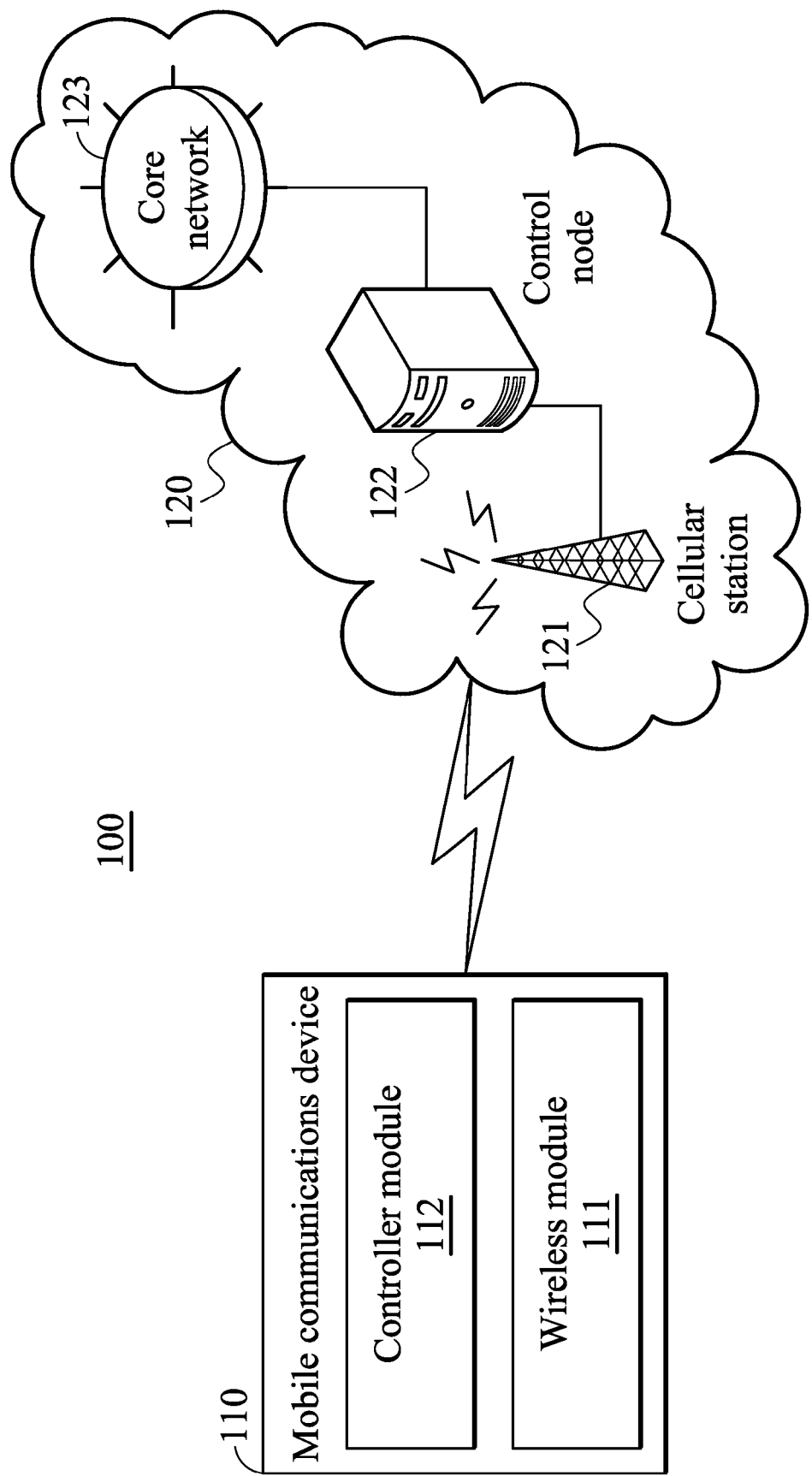
FIG. 1 is a block diagram illustrating a mobile communications environment according to an embodiment of the invention.

FIG. 1 is a block diagram illustrating a mobile communications environment according to an embodiment of the invention. In the mobile communications environment 100, the mobile communication device 110 is wirelessly connected to the service network 120 for obtaining wireless services. The service network 120 comprises at least one cellular station 121 (or a base station or an access station), at least one control node 122, and a core network 123, wherein the cellular station 121 is controlled by the control node 122 to provide the functionality of wireless transceiving for the service network 120. Though the control node 122 and the core network 123 are shown to be two separate components of the service network 120, the control node 122 and the core network 123 may be incorporated into one single component, and the invention is not limited thereto. The mobile communication device 110 comprises a wireless module 111 for performing the functionality of wireless transceiving to and from the service network 120. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 comprises a controller module 112 for controlling the operation of the wireless module 111 and other functional components, such as a display unit and/or keypad serving as the MMI (man-machine interface), a storage unit storing the program codes of applications or communication protocols, or others.

Figure 2:
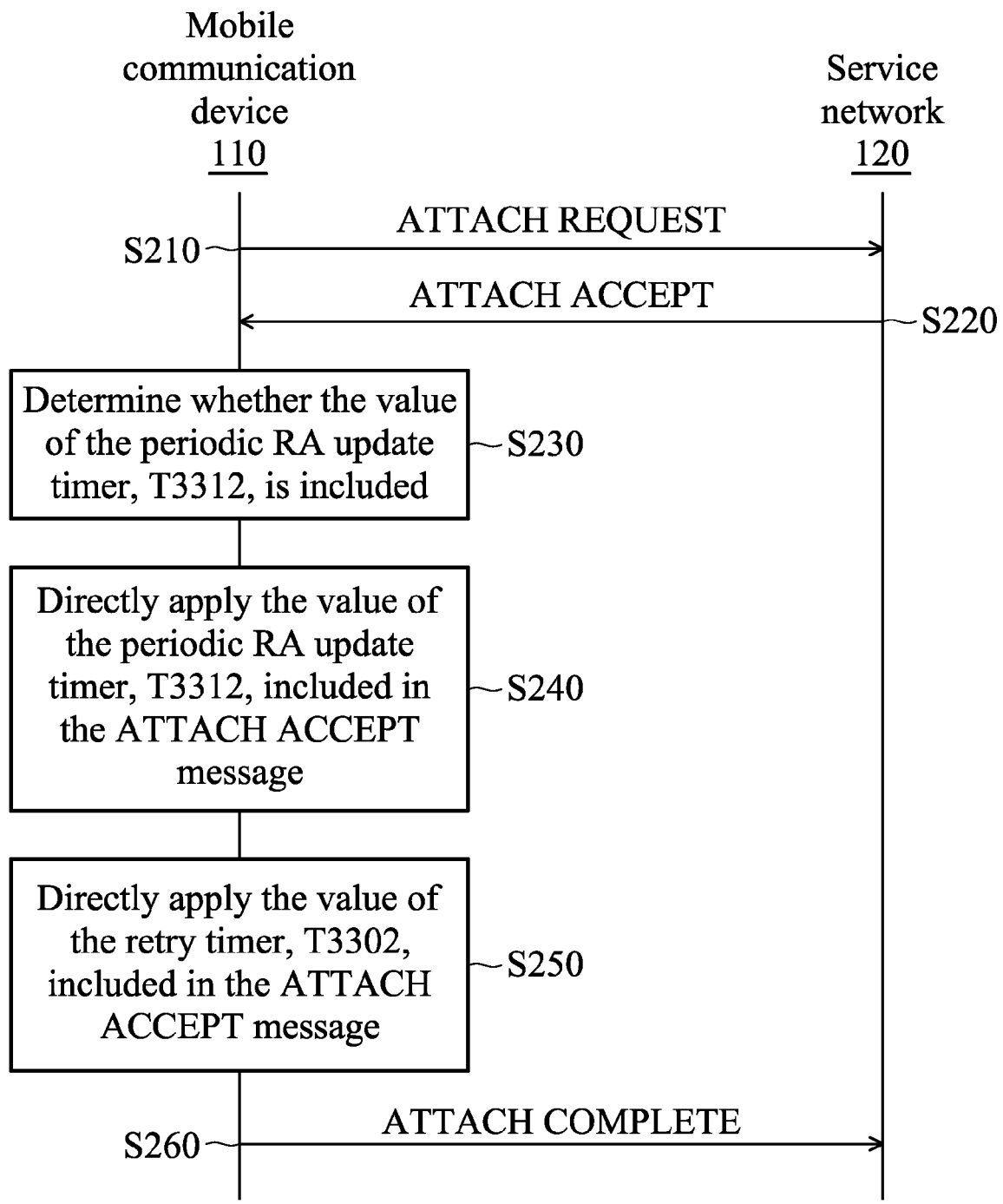
FIG. 2 is a message sequence chart illustrating a successful attachment procedure according to an embodiment of the invention.

To be more specific, the controller module 112 controls the wireless module 111 for performing attachment procedures and periodic RA update procedures with the service network 120. FIG. 2 is a message sequence chart illustrating a successful attachment procedure according to an embodiment of the invention. In this embodiment, the service network 120 may be a WCDMA network and the mobile communication device 110 may be a UE in compliance with the TS 24.008, TS 33.102, and TS 23.122 specifications and/or other related specifications of the WCDMA technology. Alternatively, the mobile communication device 110 may be a UE in compliance with the specifications of the WCDMA technology and other wireless technologies, e.g., the GSM technology, and the invention is not limited thereto. Note that, the attachment procedure is performed to register the mobile communication device 110 to the service network 120 just after the mobile communication device 110 is powered on, and the attachment procedure is performed without integrity protection. The attachment procedure may be performed without integrity protection when the mobile communication device 110 detects that no SIM (Subscriber Identity Module) or USIM (Universal Subscriber Identity Module) card is inserted or coupled therein, or the authentication of the mobile communication device 110 performed by the service network 120 is not successful. To start the attachment procedure, the controller module 112 transmits an ATTACH REQUEST message without integrity protection to the service network 120 via the wireless module 111 (step S210). The ATTACH REQUEST message may comprise the registration information concerning the mobile communication device 110. Specifically, the ATTACH REQUEST message indicates that the UE wishes to start a packet data session with the service network 120 for mobile communication services. When receiving the ATTACH REQUEST message, the service network 120 acknowledges the attachment request and then replies to the mobile communication device 110 with an ATTACH ACCEPT message without integrity protection (step S220). In this embodiment, the ATTACH ACCEPT message comprises the information concerning the attachment configurations for the mobile communication device 110, a value of the periodic RA update timer, T3312, and a value of the retry timer for the RA update procedures and the attachment procedures, T3302. When the mobile communication device 110 receives the ATTACH ACCEPT message without integrity protection, the controller module 112 determines whether the value of the periodic RA update timer, T3312, is included in the ATTACH ACCEPT message (step S230). Note that, the attachment procedure is performed just after being powered on and the ATTACH ACCEPT message is the first PS message received from the service network 120. In response to the value of the periodic RA update timer, T3312, being included in the ATTACH ACCEPT message, the controller module 112, unlike the conventional design of a WCDMA UE, directly applies the value of the periodic RA update timer, T3312, included in the ATTACH ACCEPT message, instead of comparing the value with another value from the non-existed last received PS message (step S240), so that the behavior of the mobile communication device 110 may not be indeterminate.

Next, unlike the conventional design of a WCDMA UE, the controller module 112 further directly applies the value of the retry timer for the RA update procedures or the attachment procedures, T3302, included in the ATTACH ACCEPT message, instead of applying a default value, which is 14 minutes long, for the retry timer, T3302 (step S250), so that the mobile communication device 110 may have a chance to perform a next RA update procedure or a next attachment procedure to obtain mobile communication services sooner. Alternatively, for step S250, the controller module 112 may compare the value of the retry timer, T3302, included in the ATTACH ACCEPT message with the default value, and select the one with a smaller value for the retry timer, T3302, instead of directly applying the value of the retry timer, T3302, included in the ATTACH ACCEPT message. Or even yet for step S250, the controller module 112 may directly apply a predetermined non-zero value for the retry timer, T3302, instead of the value included in the ATTACH ACCEPT message, wherein the predetermined non-zero value is smaller than the default value to ensure that a next RA update procedure or a next attachment procedure is to be performed sooner. After that, the mobile communication device 110 responds to the service network 120 with an ATTACH COMPLETE message without integrity protection to acknowledge the reception of the ATTACH ACCEPT message (step S260), and the attachment procedure ends. Regarding the detailed descriptions of the attachment configurations, which are omitted here for brevity as they are beyond the scope of the invention, references may be made to the TS 24.008, TS 33.102, and TS 23.122 specifications and/or other related specifications of the WCDMA technology.

Figure 3:
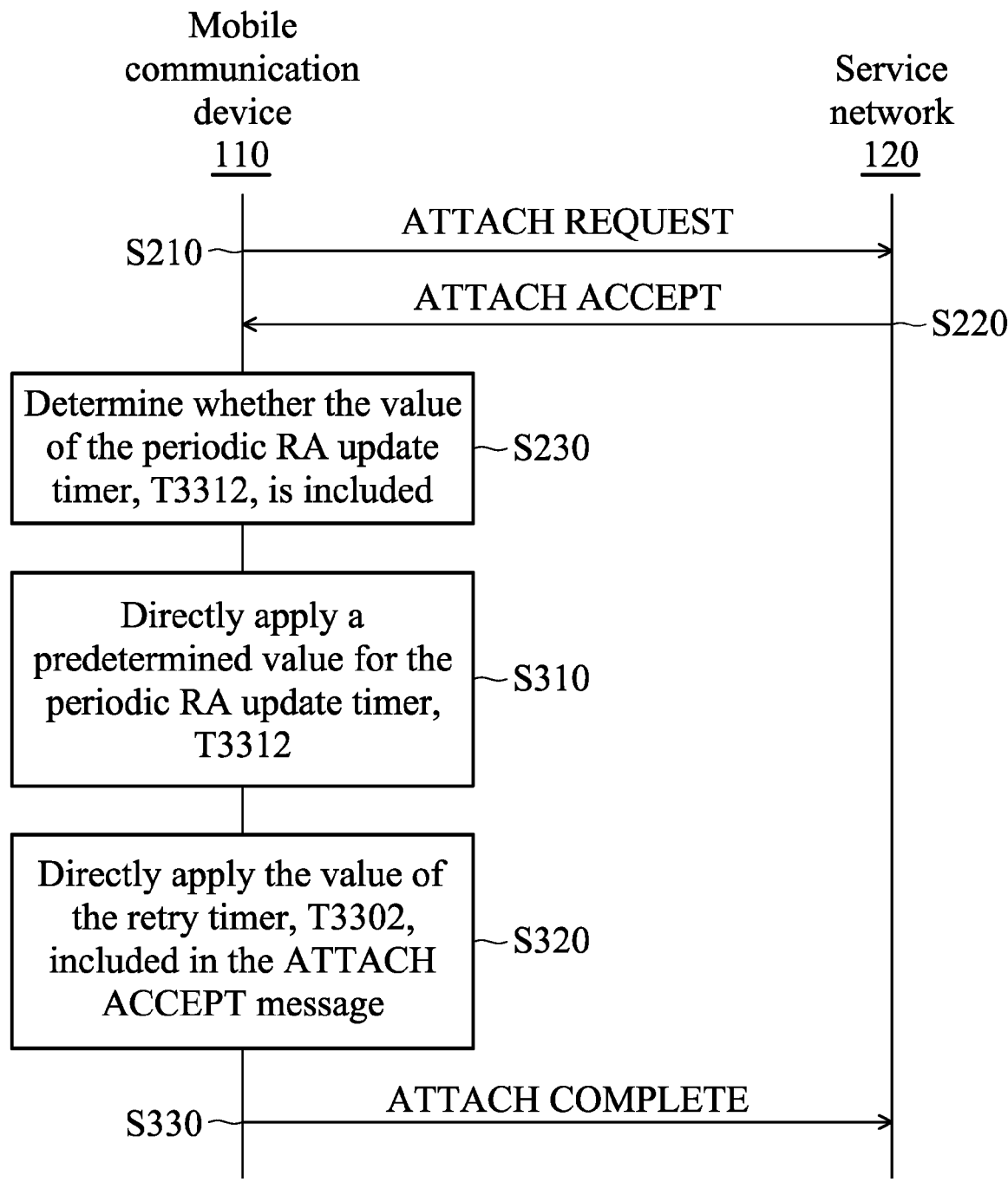
FIG. 3 is a message sequence chart illustrating a successful attachment procedure according to another embodiment of the invention.

FIG. 3 is a message sequence chart illustrating a successful attachment procedure according to another embodiment of the invention. Similar to FIG. 2, the attachment procedure is started by the mobile communication device 110 transmitting an ATTACH REQUEST message without integrity protection to the service network 120 (step S210), and receiving an ATTACH REQUEST message without integrity protection from the service network 120 (step S220). In this embodiment, the ATTACH ACCEPT message comprises the information concerning the attachment configurations for the mobile communication device 110 and only a value for the periodic RA update timer, T3302. Subsequently, the controller module 112 determines whether the value of the periodic RA update timer, T3312, is included in the ATTACH ACCEPT message (step S230). In response to the value of the periodic RA update timer, T3312, not being included in the ATTACH ACCEPT message, the controller module 112, unlike the conventional design of a WCDMA UE, directly applies a predetermined non-zero value for the periodic RA update timer, T3312, instead of applying a default value of the periodic RA update timer, T3312 (step S310). Particularly, the predetermined non-zero value is smaller than the default value of the periodic RA update timer, T3312. By applying the predetermined non-zero value, the mobile communication device 110 is given the benefit to perform a next RA update procedure to obtain mobile communication services sooner.

Next, unlike the conventional design of a WCDMA UE, the controller module 112 further directly applies the value of the retry timer for the RA update procedures or the attachment procedures, T3302, included in the ATTACH ACCEPT message, instead of applying a default value, which is 14 minutes long, for the retry timer, T3302 (step S320), so that the mobile communication device 110 may have a chance to perform a next RA update procedure or a next attachment procedure to obtain mobile communication services sooner. Alternatively, for step S320, the controller module 112 may compare the value of the retry timer, T3302, included in the ATTACH ACCEPT message with the default value, and select the one with a smaller value for the retry timer, T3302, instead of directly applying the value for the retry timer, T3302, included in the ATTACH ACCEPT message. Or even yet for step S320, the controller module 112 may directly apply a predetermined non-zero value for the retry timer, T3302, instead of the value included in the ATTACH ACCEPT message, wherein the predetermined non-zero value is smaller than the default value to ensure that a next RA update procedure or a next attachment procedure is to be performed sooner. After that, the mobile communication device 110 responds to the service network 120 with an ATTACH COMPLETE message without integrity protection to acknowledge the reception of the ATTACH ACCEPT message (step S330), and the attachment procedure ends. Regarding the detailed descriptions of the attachment configurations, which are omitted here for brevity as they are beyond the scope of the invention, references may be made to the TS 24.008, TS 33.102, and TS 23.122 specifications and/or other related specifications of the WCDMA technology.

Figure 4:
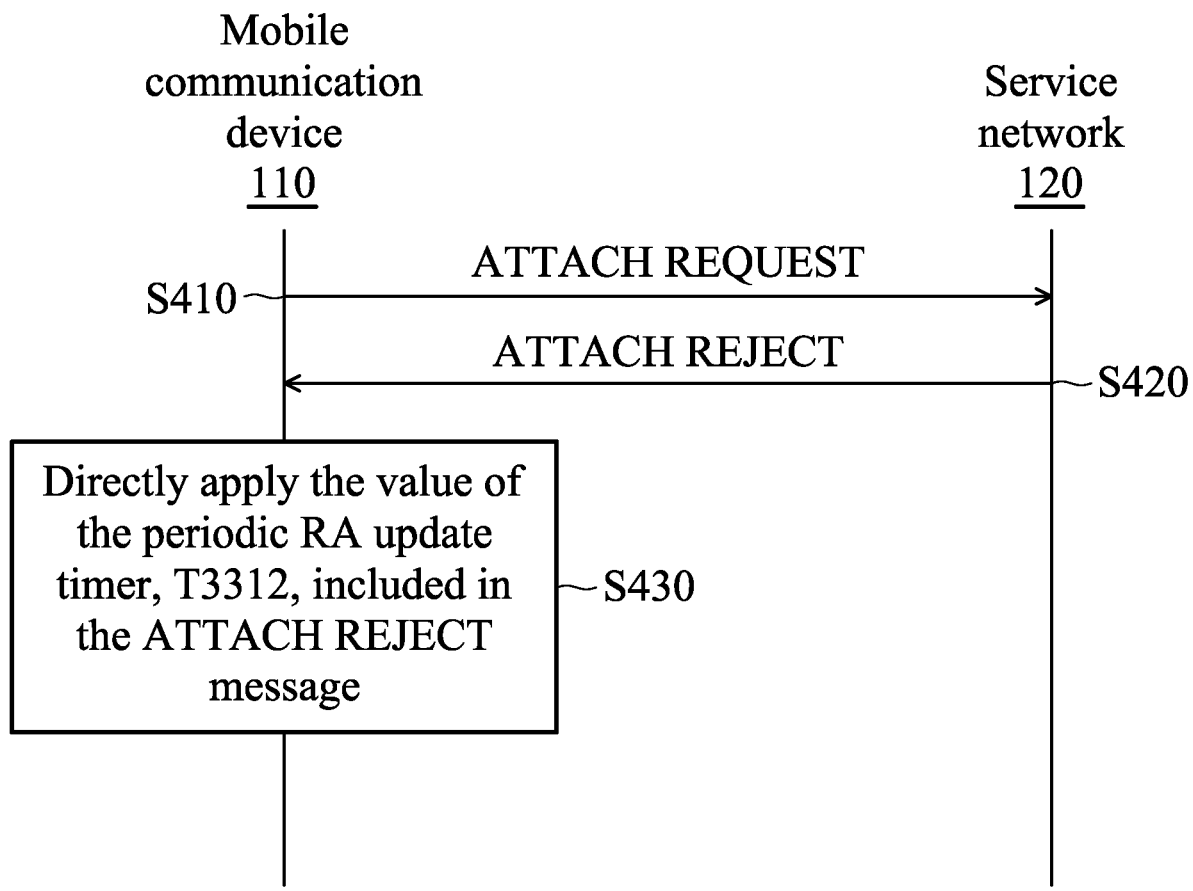
FIG. 4 is a message sequence chart illustrating an unsuccessful attachment procedure according to an embodiment of the invention.

FIG. 4 is a message sequence chart illustrating an unsuccessful attachment procedure according to an embodiment of the invention. Similar to FIG. 2, the service network 120 may be a WCDMA system and the mobile communication device 110 may be a UE in compliance with the TS 24.008, TS 33.102, and TS 23.122 specifications and/or other related specifications of the WCDMA technology. Alternatively, the mobile communication device 110 may be a UE in compliance with the specifications of the WCDMA technology and other wireless technologies, e.g., the GSM technology, and the invention is not limited thereto. Note that, the attachment procedure is performed to register the mobile communication device 110 to the service network 120 just after the mobile communication device 110 is powered on, and the attachment procedure is performed without integrity protection. The attachment procedure may be performed without integrity protection when the mobile communication device 110 detects that no SIM/USIM card is inserted or coupled therein, or the authentication of the mobile communication device 110 performed by the service network 120 is not successful. To start the attachment procedure, the controller module 112 transmits an ATTACH REQUEST message without integrity protection to the service network 120 via the wireless module 111 (step S410). The ATTACH REQUEST message may comprise the registration information concerning the mobile communication device 110. Specifically, the ATTACH REQUEST message indicates that the UE wishes to start a packet data session with the service network 120 for mobile communication services. When receiving the ATTACH REQUEST message, the service network 120 acknowledges that the attachment request but decides to reject the attachment request, so it replies to the mobile communication device 110 with an ATTACH REJECT message without integrity protection (step S420). The ATTACH REJECT message may comprise the information concerning a value of the retry timer for the RA update procedures or the attachment procedures, T3302, and a rejection cause. When the mobile communication device 110 receives the ATTACH REJECT message without integrity protection, the controller module 112 directly applies the value of the retry timer, T3302, included in the ATTACH REJECT message, instead of applying a default value, which is 14 minutes long, for the retry timer, T3302 (step S430), so that the mobile communication device 110 may have a chance to perform a next RA update procedure or a next attachment procedure to obtain mobile communication services sooner. Alternatively, for step S430, the controller module 112 may compare the value of the retry timer, T3302, included in the ATTACH REJECT message with the default value, and select the one with a smaller value for the retry timer, T3302, instead of directly applying the value of the retry timer, T3302, included in the ATTACH REJECT message. Or even yet for step S430, the controller module 112 may directly apply a predetermined non-zero value for the retry timer, T3302, instead of the value included in the ATTACH REJECT message, wherein the predetermined non-zero value is smaller than the default value to ensure that a next RA update procedure or a next attachment procedure is to be performed sooner.

Figure 5:
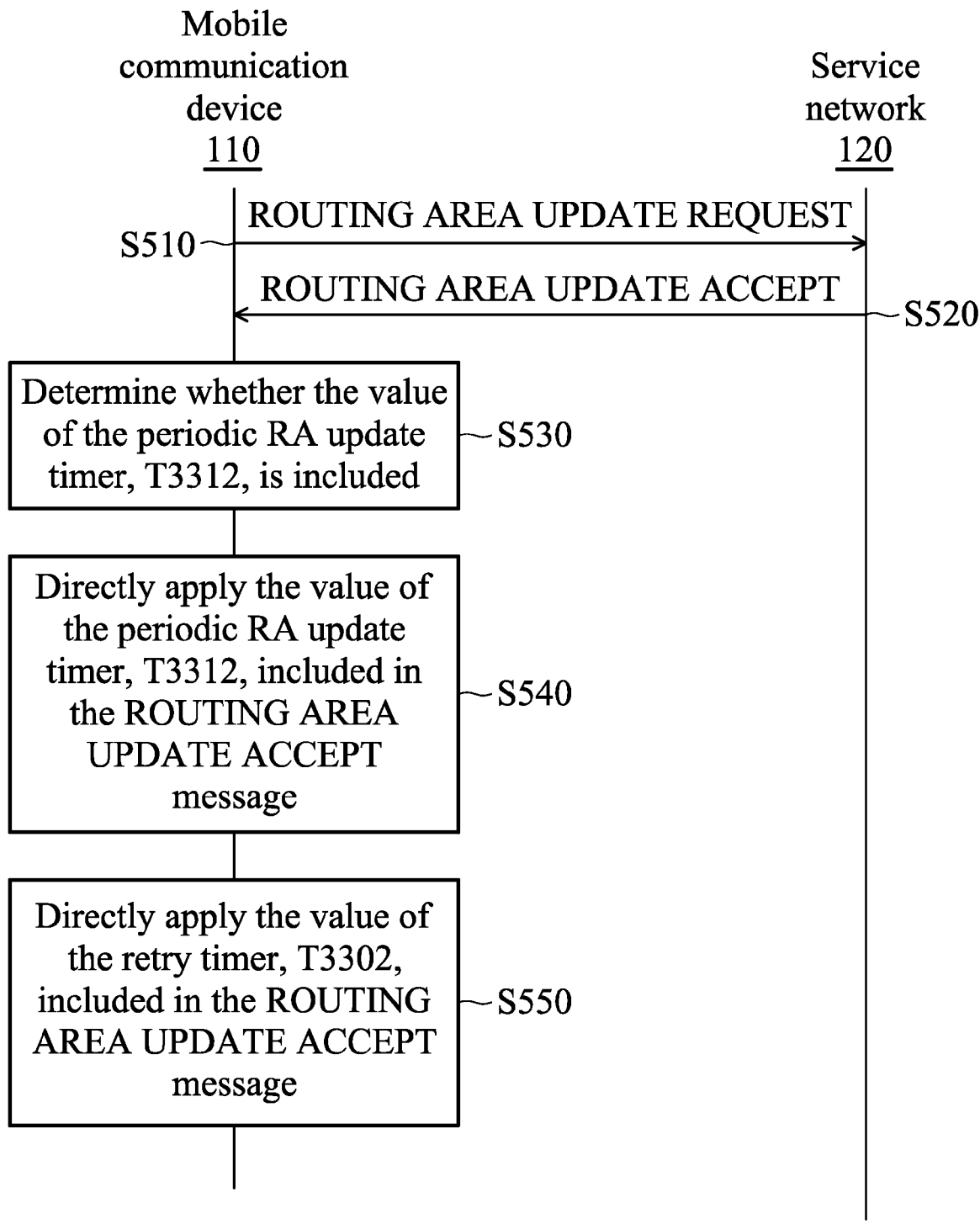
FIG. 5 is a message sequence chart illustrating a periodic RA update procedure according to an embodiment of the invention.

FIG. 5 is a message sequence chart illustrating a periodic RA update procedure according to an embodiment of the invention. Similar to FIG. 2, the service network 120 may be a WCDMA system and the mobile communication device 110 may be a UE in compliance with the TS 24.008, TS 33.102, and TS 23.122 specifications and/or other related specifications of the WCDMA technology. Alternatively, the mobile communication device 110 may be a UE in compliance with the specifications of the WCDMA technology and other wireless technologies, e.g., the GSM technology, and the invention is not limited thereto. Note that, in this embodiment, the periodic RA update procedure is performed after the successful attachment procedure as described in FIG. 2, and is also performed without integrity protection. The periodic RA update procedure may be triggered by the mobile communication device 110 to inform the service network 120 of its location information with respect to the routing area deployment of the service network 120. To start the periodic RA update procedure, the controller module 112 transmits a ROUTING AREA UPDATE REQUEST message without integrity protection to the service network 120 via the wireless module 111 (step S510). The ROUTING AREA UPDATE REQUEST message may comprise the information of the routing area where the mobile communication device 110 is currently in. When receiving the ROUTING AREA UPDATE REQUEST message without integrity protection, the service network 120 replies to the mobile communication device 110 with a ROUTING AREA UPDATE ACCEPT message without integrity protection (step S520). The ROUTING AREA UPDATE ACCEPT message may comprise the information concerning a value of the periodic RA update timer, T3312, and a value of the retry timer for the RA update procedures or the attachment procedures, T3302. Specifically in this embodiment, for the service network 120 meaning to deactivate the periodic RA update timer, T3312, the information included in the ROUTING AREA UPDATE ACCEPT message indicates a zero value for the periodic RA update timer, T3312, or indicates deactivation of the periodic RA update timer, T3312. When the mobile communication device 110 receives the ROUTING AREA UPDATE ACCEPT message without integrity protection, the controller module 112 determines whether the value of the periodic RA update timers, T3312, is included in the ROUTING AREA UPDATE ACCEPT message (step S530). In response to the value of the periodic RA update timers, T3312, being included in the ROUTING AREA UPDATE ACCEPT message, the controller module 112, unlike the conventional design of a WCDMA UE, directly applies the value of the periodic RA update timer, T3312, included in the ROUTING AREA UPDATE ACCEPT message, instead of applying the value indicated in the last received PS message (step S540). That is, the controller module 112 deactivates the periodic RA update timer, T3312, in response to the ROUTING AREA UPDATE ACCEPT message indicating a zero value for the periodic RA update timers, T3312, or indicating deactivation of the periodic RA update timers, T3312. Thus, the consistency regarding the periodic RA update timer, T3312, is properly maintained between the mobile communication device 110 and the service network 120.

Subsequent to step S540, unlike the conventional design of a WCDMA UE, the controller module 112 further directly applies the value of the retry timer, T3302, included in the ROUTING AREA UPDATE ACCEPT message, instead of applying a default value, which is 14 minutes long, for the retry timer, T3302 (step S550), so that the mobile communication device 110 may have a chance to perform a next RA update procedure or a next attachment procedure to obtain mobile communication services sooner. Alternatively, for step S550, the controller module 112 may compare the value of the retry timer, T3302, included in the ROUTING AREA UPDATE ACCEPT message with the default value, and select the one with a smaller value for the retry timer, T3302, instead of directly applying the value of the retry timer, T3302, included in the ROUTING AREA UPDATE ACCEPT message. Or even yet for step S550, the controller module 112 may directly apply a predetermined non-zero value for the retry timer, T3302, instead of the value included in the ROUTING AREA UPDATE ACCEPT message, wherein the predetermined non-zero value is smaller than the default value to ensure that a next RA update procedure or a next attachment procedure is to be performed sooner.

Figure 6:
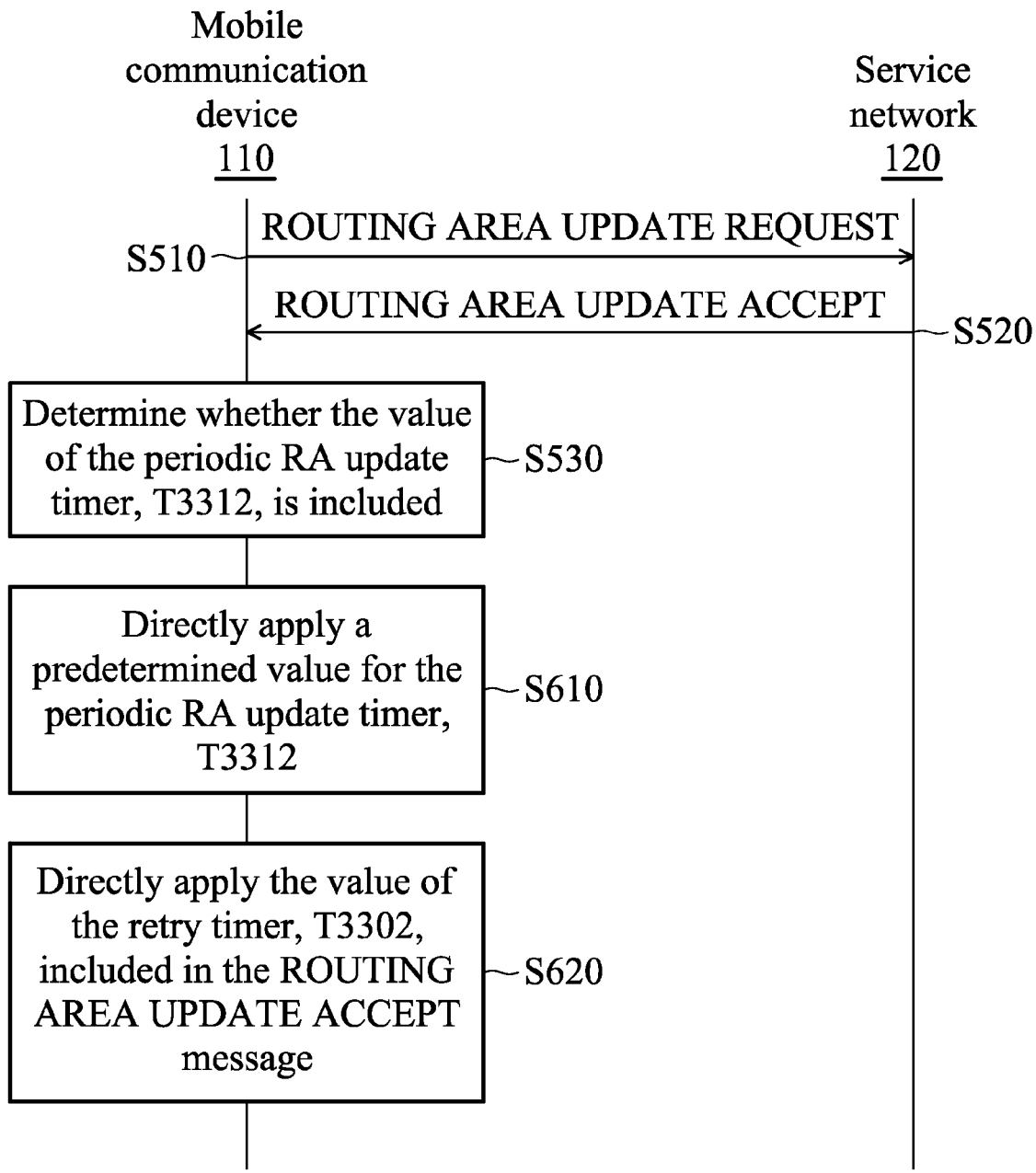
FIG. 6 is a message sequence chart illustrating a periodic RA update procedure according to an embodiment of the invention.

FIG. 6 is a message sequence chart illustrating a periodic RA update procedure according to an embodiment of the invention. Similar to FIG. 5, the periodic RA update procedure is started by the mobile communication device 110 transmitting a ROUTING AREA UPDATE REQUEST message without integrity protection to the service network 120 (step S510) and receiving a ROUTING AREA UPDATE ACCEPT message without integrity protection from the service network 120 (step S520). In this embodiment, the ROUTING AREA UPDATE ACCEPT message comprises the information concerning only the value of the retry timer, T3302. When the mobile communication device 110 receives the ROUTING AREA UPDATE ACCEPT message without integrity protection, the controller module 112 determines whether a value of the periodic RA update timers, T3312, is included in the ROUTING AREA UPDATE ACCEPT message (step S530). In response to the value of the periodic RA update timer, T3312, not being included in the ROUTING AREA UPDATE ACCEPT message, the controller module 112, unlike the conventional design of a WCDMA UE, directly applies a predetermined non-zero value for the periodic RA update timer, T3312, instead of applying a default value for the periodic RA update timer, T3312 (step S610). Particularly, the predetermined non-zero value is smaller than the default value. By applying the predetermined non-zero value for the periodic RA update timer, T3312, the mobile communication device 110 is given the benefit to perform a periodic RA update procedure to obtain normal services sooner.

Subsequent to step S610, unlike the conventional design of a WCDMA UE, the controller module 112 further directly applies the value of the retry timer, T3302, included in the ROUTING AREA UPDATE ACCEPT message, instead of applying a default value, which is 14 minutes long, for the retry timer, T3302 (step S620), so that the mobile communication device 110 may have a chance to perform a next periodic RA update procedure or a next attachment procedure to obtain mobile communication services sooner. Alternatively, for step S620, the controller module 112 may compare the value of the retry timer, T3302, included in the ROUTING AREA UPDATE ACCEPT message with the default value, and select the one with a smaller value for the retry timer, T3302, instead of directly applying the value of the retry timer, T3302, included in the ROUTING AREA UPDATE ACCEPT message. Or even yet for step S620, the controller module 112 may directly apply a predetermined non-zero value for the retry timer, T3302, instead of the value included in the ROUTING AREA UPDATE ACCEPT message, wherein the predetermined non-zero value is smaller than the default value to ensure that a next RA update procedure or a next attachment procedure is to be performed sooner.

Figure 7:
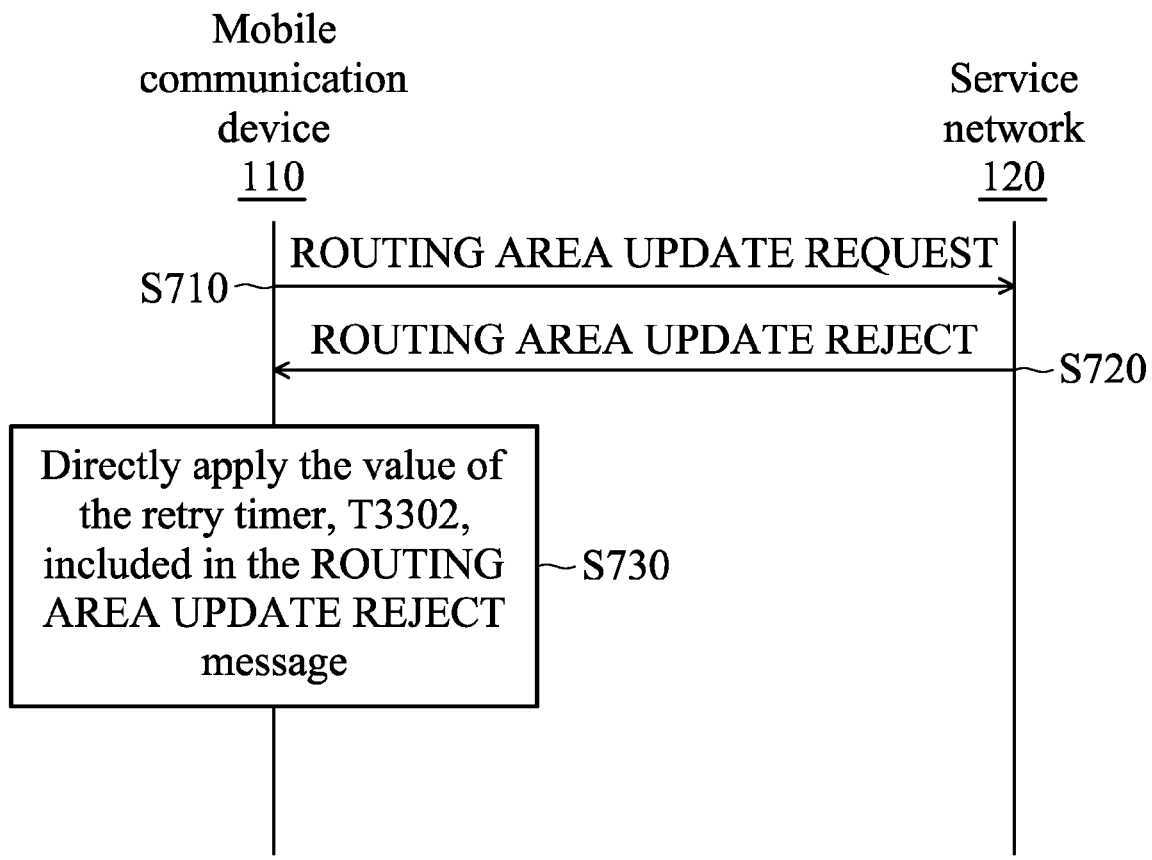
FIG. 7 is a message sequence chart illustrating an unsuccessful periodic RA update procedure according to an embodiment of the invention.

FIG. 7 is a message sequence chart illustrating an unsuccessful periodic RA update procedure according to an embodiment of the invention. Similar to FIG. 5, the service network 120 may be a WCDMA system and the mobile communication device 110 may be a UE in compliance with the TS 24.008, TS 33.102, and TS 23.122 specifications and/or other related specifications of the WCDMA technology.

Alternatively, the mobile communication device 110 may be a UE in compliance with the specifications of the WCDMA technology and other wireless technologies, e.g., the GSM technology, and the invention is not limited thereto. Note that, in this embodiment, the periodic RA update procedure is performed after the successful attachment procedure as described in FIG. 2, and is also performed without integrity protection. The periodic RA update procedure may be triggered by the mobile communication device 110 to inform the service network 120 of its location information with respect to the routing area deployment of the service network 120. To start the periodic RA update procedure, the controller module 112 transmits a ROUTING AREA UPDATE REQUEST message without integrity protection to the service network 120 via the wireless module 111 (step S710). The ROUTING AREA UPDATE REQUEST message may comprise the information of the routing area where the mobile communication device 110 is currently in. When receiving the ROUTING AREA UPDATE REQUEST message without integrity protection, the service network 120 acknowledges that the RA update request but decides to reject the RA update request, so it replies to the mobile communication device 110 with a ROUTING AREA UPDATE REJECT message without integrity protection (step S720). The ROUTING AREA UPDATE REJECT message may comprise the information concerning a value of the retry timer, T3302, and a rejection cause. When the mobile communication device 110 receives the ROUTING AREA UPDATE REJECT message without integrity protection, the controller module 112 directly applies the value of the retry timer, T3302, included in the ROUTING AREA UPDATE REJECT message, instead of applying a default value, which is 14 minutes long, for the retry timer, T3302 (step S730), so that the mobile communication device 110 may have a chance to perform a next RA update procedure or a next attachment procedure to obtain mobile communication services sooner. Alternatively, for step S730, the controller module 112 may compare the value of the retry timer, T3302, included in the ROUTING AREA UPDATE REJECT message with the default value, and select the one with a smaller value for the retry timer, T3302, instead of directly applying the value included in the ROUTING AREA UPDATE REJECT message. Or even yet for step S730, the controller module 112 may directly apply a predetermined non-zero value for the retry timer, T3302, instead of the value included in the ROUTING AREA UPDATE REJECT message, wherein the predetermined non-zero value is smaller than the default value to ensure that a next RA update procedure or a next attachment procedure is to be performed sooner.

In addition to solving the inconsistency of the periodic RA update timer between a mobile communications device and a service network, and solving the problem of inappropriately prolonging the periodic RA update procedure, by a mobile communications device as described in FIGS. 2-7, the invention also proposes to handle the periodic RA update timer, T3312, by a service network, to avoid the mobile communication devices from being maliciously manipulated by a fake service network. Take the service network 120 being a WCDMA system and the mobile communication device 110 being a UE in compliance with the TS 24.008, TS 33.102, and TS 23.122 specifications and/or other related specifications of the WCDMA technology as an example. When receiving an ATTACH REQUEST message without integrity protection or a ROUTING AREA UPDATE REQUEST message without integrity protection from the mobile communication device 110, the service network 120 may prepare an ATTACH ACCEPT message or a ROUTING AREA UPDATE ACCEPT message which includes information indicating a non-zero and non-deactivation-intended value of the periodic RA update timer, T3312, and then reply to the mobile communication device 110 with the ATTACH ACCEPT message without integrity protection. When the mobile communication device 110 receives the ATTACH ACCEPT message or the ROUTING AREA UPDATE ACCEPT message without integrity protection, the controller module 112 may accordingly apply the value of the periodic RA update timer, T3312, included in the ATTACH ACCEPT message or the ROUTING AREA UPDATE ACCEPT message. In another embodiment, if a PS message containing another value of the periodic RA update timer, T3312, is received prior to the ATTACH ACCEPT message or the ROUTING AREA UPDATE ACCEPT message, the controller module 112 may compare the two values for the periodic RA update timer, T3312, included in the last received PS message, and the ATTACH ACCEPT message or the ROUTING AREA UPDATE ACCEPT message, respectively. Note that the value of the periodic RA update timer, T3312, included in the last received PS message is also a non-zero and non-deactivation-intended value. According to the comparison result, the controller module 112 may apply the one with a smaller value for the periodic RA update timer, T3312. Since a non-zero and non-deactivation-intended value is applied for the periodic RA update timer, T3312, the mobile communication device 110 may have a better chance to obtain normal services, instead of being forced to obtain emergency services only.

Figure 8:
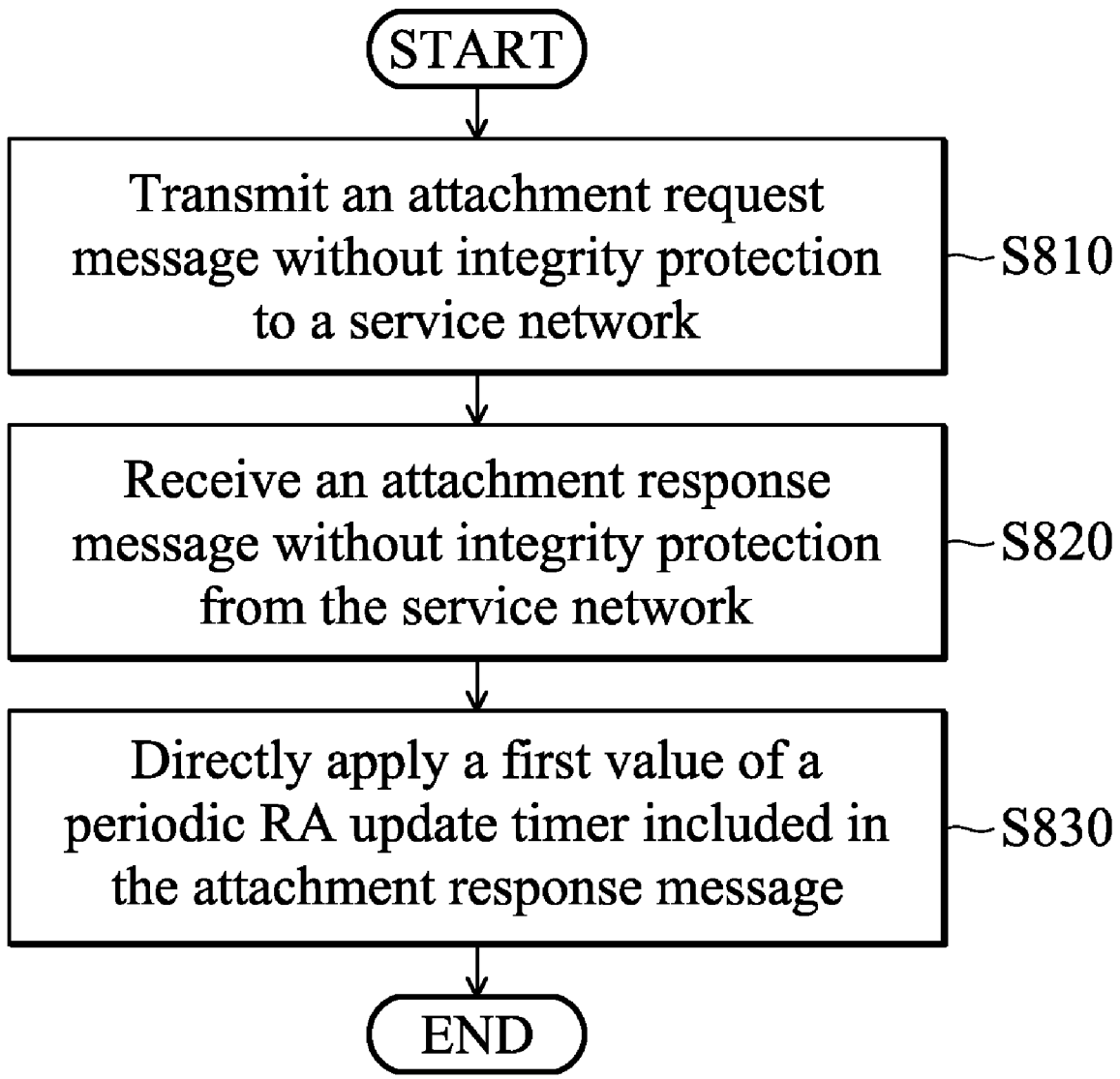
FIG. 8 is a flow chart illustrating a method for handling a periodic RA update timer during an attachment procedure without integrity protection by a mobile communications device according to an embodiment of the invention.

FIG. 8 is a flow chart illustrating a method for handling a periodic RA update timer during an attachment procedure without integrity protection by a mobile communications device according to an embodiment of the invention. In this embodiment, the mobile communication device is wirelessly connected to a service network for obtaining mobile communication services. The service network may be a WCDMA system and the mobile communication device may be a UE in compliance with the TS 24.008, TS 33.102, and TS 23.122 specifications and/or other related specifications of the WCDMA technology. Alternatively, the mobile communication device may be a UE in compliance with the specifications of the WCDMA technology and other wireless technologies, e.g., the GSM technology, and the invention is not limited thereto. To begin, the mobile communication device performs an attachment procedure with the service network. Specifically, the mobile communication device transmits an ATTACH REQUEST message without integrity protection to the service network (step S810). Next, the mobile communication device receives an ATTACH ACCEPT message without integrity protection from the service network (step S820), and directly applies a first value of the periodic RA update timer included in the ATTACH ACCEPT message (step S830). Specifically, the first periodic RA update timer may be the timer T3312 in the WCDMA technology. Note that, the attachment procedure is performed just after being powered on and the ATTACH ACCEPT message is the first PS message received from the service network. Thus, the method prevents the mobile communication device from comparing the first value in the ATTACH ACCEPT message with another value from a non-existed last received PS message, so the behavior of the mobile communication device, unlike the conventional design of a WCDMA UE, may not be indeterminate. In another embodiment, before step S830, the mobile communication device may first determine whether the ATTACH ACCEPT message comprises a value of the periodic RA update timer, and step S830 is only performed if the ATTACH ACCEPT message comprises a value of the periodic RA update timer. Otherwise, if the ATTACH ACCEPT message does not comprise a value of the periodic RA update timer, the mobile communication device may directly apply a predetermined non-zero value for the periodic RA update timer, wherein the predetermined non-zero value is smaller than the default value of the periodic RA update timer.

In addition to the attachment procedure, the mobile communication device may subsequently perform a periodic RA update procedure. To further clarify, the mobile communication device transmits a ROUTING AREA UPDATE REQUEST message without integrity protection to the service network, and receives a ROUTING AREA UPDATE ACCEPT message without integrity protection from the service network, wherein a second value for the periodic RA update timer is included in the ROUTING AREA UPDATE ACCEPT message. Next, the mobile communication device directly applies the second value of the periodic RA update timer included in the ROUTING AREA UPDATE ACCEPT message. That is, if the service network wants to deactivate the periodic RA update timer and prepares the ROUTING AREA UPDATE ACCEPT message with a zero value for the periodic RA update timer or indicating deactivation of the periodic RA update timer, then the mobile communication device may deactivate the periodic RA update timer when receiving the ROUTING AREA UPDATE ACCEPT message. In another embodiment, before directly applying the second value of the periodic RA update timer, the mobile communication device may first determine whether the ROUTING AREA UPDATE ACCEPT message comprises a value of the periodic RA update timer, and only directly applies the second value of the periodic RA update timer if a value of the periodic RA update timer is included in the ROUTING AREA UPDATE ACCEPT message. Otherwise, if no value of the first periodic RA update timer is included in the ROUTING AREA UPDATE ACCEPT message, the mobile communication device may directly apply a predetermined non-zero value for the periodic RA update timer, wherein the predetermined non-zero value is smaller than the default value of the periodic RA update timer.

Note that, in FIG. 8, the service network may as well handle the periodic RA update timer for non-integrity protected PS messages, to avoid the mobile communication device being maliciously manipulated by a fake service network. To further clarify, when receiving the ATTACH REQUEST message without integrity protection or a ROUTING AREA UPDATE REQUEST message without integrity protection from the mobile communication device, the service network may prepare the ATTACH ACCEPT message or the ROUTING AREA UPDATE ACCEPT message which includes information indicating a non-zero and non-deactivation-intended value for the periodic RA update timer, and then reply to the mobile communication device with the ATTACH ACCEPT message without integrity protection or the ROUTING AREA UPDATE ACCEPT message without integrity protection. Since a non-zero and non-deactivation-intended value is applied for the periodic RA update timer, the mobile communication device may have a better chance to obtain normal services, instead of being forced to obtain emergency services only.

Figure 9:
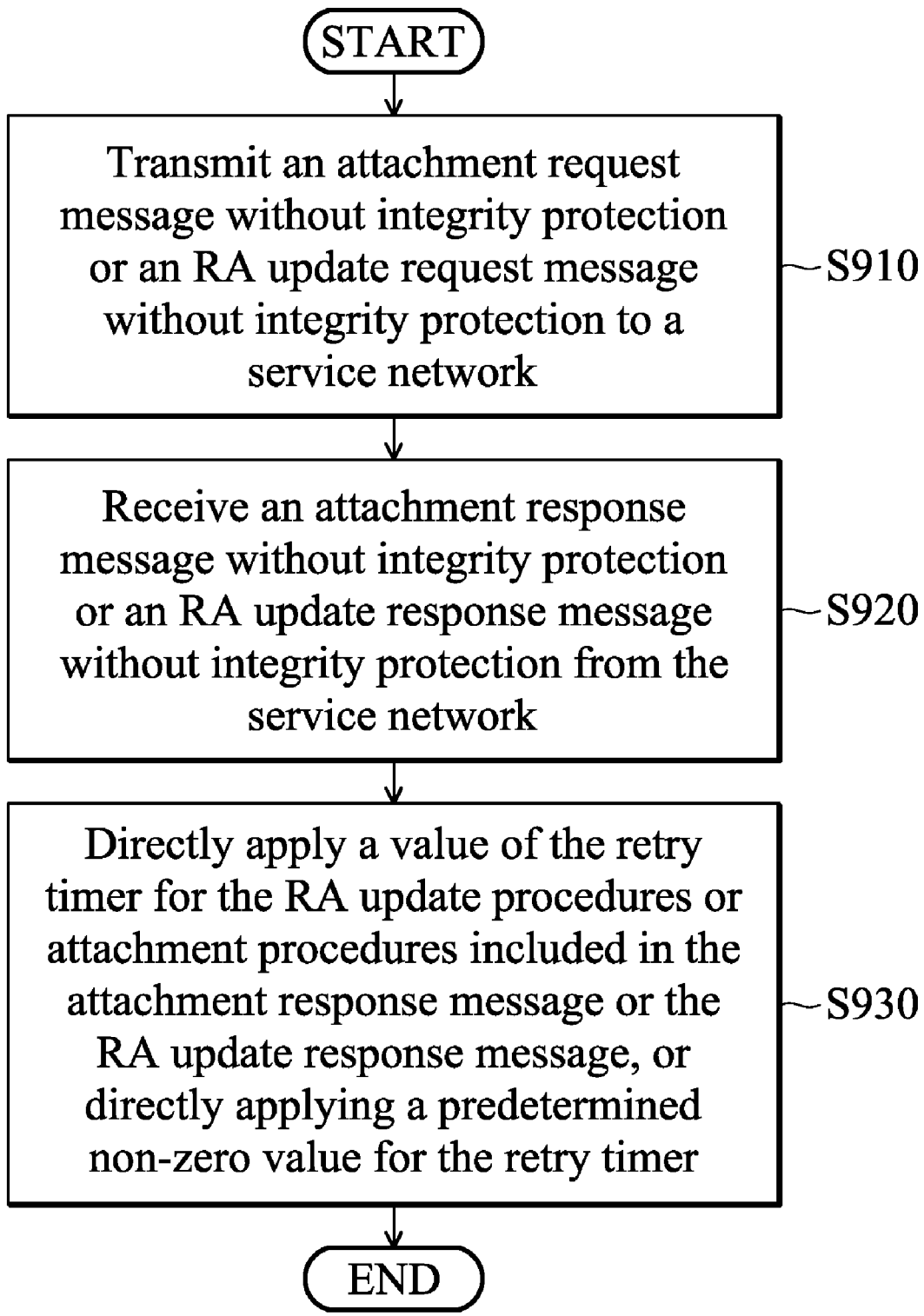
FIG. 9 is a flow chart illustrating a method for handling a retry timer for an RA update procedure or an attachment procedure without integrity protection by a mobile communications device according to an embodiment of the invention.

FIG. 9 is a flow chart illustrating a method for handling a retry timer for an RA update procedure or an attachment procedure without integrity protection by a mobile communications device according to an embodiment of the invention. Similar to FIG. 8, the mobile communication device is wirelessly connected to a service network for obtaining mobile communication services, and an attachment procedure or an RA update procedure is to be performed. Specifically, the service network may be a WCDMA system and the mobile communication device may be a UE in compliance with the TS 24.008, TS 33.102, and TS 23.122 specifications and/or other related specifications of the WCDMA technology. Alternatively, the mobile communication device may be a UE in compliance with the specifications of the WCDMA technology and other wireless technologies, e.g., the GSM technology, and the invention is not limited thereto. To begin, the mobile communication device transmits an ATTACH REQUEST message or a ROUTING AREA UPDATE REQUEST message without integrity protection to the service network (step S910), and receives an ATTACH ACCEPT or a ROUTING AREA UPDATE ACCEPT message without integrity protection from the service network (step S920), wherein a value of the retry timer for the RA update procedure or the attachment procedure is included in the ATTACH ACCEPT message or the ROUTING AREA UPDATE ACCEPT message. Next, the mobile communication device directly applies the value of the retry timer included in the ATTACH ACCEPT message or the ROUTING AREA UPDATE ACCEPT message, or directly applies a predetermined non-zero value for the retry timer, wherein the predetermined non-zero value is smaller than a default value of the retry timer (step S930). Specifically, the retry timer may be the timer T3302 in the WCDMA technology and the default value of the timer T3302 may be 14 minutes long. In another embodiment, before step S930, the mobile communication device may compare the value of the retry timer included in the ATTACH ACCEPT message or the ROUTING AREA UPDATE ACCEPT message with a default value of the retry timer, and if the value is greater than or equal to the default value, then directly applies the default value of the retry timer for the RA update procedure or the attachment procedure. Otherwise, step S930 is performed, if the value is smaller than the default value.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communication device, comprising:
a wireless module performing wireless transceiving to and from a service network; and
a controller module transmitting an attachment request message without integrity protection to the service network via the wireless module, receiving an attachment response message without integrity protection from the service network via the wireless module, and directly applying a first value of a periodic Routing Area (RA) update timer included in the attachment response message.

2. The mobile communication device of claim 1, wherein the attachment response message is an attachment acceptance message or an attachment rejection message, and the mobile communication device further attaches to the service network via the wireless module according to the attachment acceptance message.

3. The mobile communication device of claim 2, wherein the controller module further transmits an RA update request message without integrity protection to the service network via the wireless module, receives an RA update response message without integrity protection from the service network via the wireless module.

4. The mobile communication device of claim 3, wherein the RA update response message indicates a zero value of the periodic RA update timer or indicates deactivation of the periodic RA update timer, and the controller module further deactivates the periodic RA update timer according to the RA update response message.

5. The mobile communication device of claim 1, wherein the service network sets the periodic RA update timer with a non-zero value or a non-deactivation-intended value in the attachment response message.

6. The mobile communication device of claim 1, wherein, prior to directly applying the first value, the controller module further determines whether the attachment response message comprises the first value, and the step of directly applying the first value is performed in response to the attachment response message comprising the first value.

7. The mobile communication device of claim 6, wherein the controller module further directly applies a predetermined non-zero value for the periodic RA update timer, in response to the attachment response message not comprising the first value, and the predetermined non-zero value is smaller than a default value of the periodic RA update timer.

8. The mobile communication device of claim 3, wherein the controller module further determines whether the RA update response message comprises a second value of the periodic RA update timer, and directly applies a predetermined non-zero value for the periodic RA update timer, in response to the attachment acceptance message not comprising the second value, and the predetermined non-zero value is smaller than a default value of the periodic RA update timer.

9. The mobile communication device of claim 1, wherein the periodic RA update timer is a T3312 timer in the Wideband Code Division Multiple Access (WCDMA) technology.

10. A mobile communication device, comprising:
a wireless module performing wireless transceiving to and from a service network; and
a controller module transmitting an attachment request message without integrity protection or a Routing Area (RA) update request message without integrity protection to the service network via the wireless module, receiving an attachment response message without integrity protection or an RA update response message without integrity protection from the service network via the wireless module, and directly applying a value of a retry timer for RA update procedures or attachment procedures included in the attachment response message or the RA update response message, or directly applying a predetermined non-zero value for the retry timer,
wherein the predetermined non-zero value is smaller than a default value of the retry timer.

11. The mobile communication device of claim 10, wherein, prior to directly applying the value of the retry timer for the RA update procedures or the attachment procedures, the controller module further compares the value with a default value for the RA update procedures or the attachment procedures, and directly applies the default value of the retry timer for the RA update procedures or the attachment procedures in response to the value being greater than or equal to the default value, and wherein the step of directly applying the value of the retry timer for the RA update procedures or the attachment procedures is performed in response to the value being smaller than the default value.

12. The mobile communication device of claim 10, wherein the retry timer is a T3302 timer in the Wideband Code Division Multiple Access (WCDMA) technology.

* * * * *